United States Patent
Kuo et al.

(10) Patent No.: US 9,749,674 B2
(45) Date of Patent: Aug. 29, 2017

(54) AUDIO AND VIDEO SYNCHRONIZATION METHOD AND TERMINAL DEVICE USING THE SAME

(71) Applicant: HON HAI PRECISION INDUSTRY CO., LTD., New Taipei (TW)

(72) Inventors: Che-Ming Kuo, New Taipei (TW); Yu-Ya Huang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 15/196,056

(22) Filed: Jun. 29, 2016

(65) Prior Publication Data

US 2017/0055019 A1   Feb. 23, 2017

(30) Foreign Application Priority Data

Aug. 17, 2015   (TW) .............................. 104126754 A (51) Int. Cl.
*H04N 21/43* (2011.01)
*H04N 5/04* (2006.01)

(52) U.S. Cl.
CPC ........... *H04N 21/4302* (2013.01); *H04N 5/04* (2013.01)

(58) Field of Classification Search
CPC ............ H04N 21/242; H04N 21/4307; H04N 21/2368; H04N 19/68; H04N 17/002; H04N 17/004; H04N 17/04; H04N 17/02; H04N 17/00; H04N 1/6055; H04N 2017/006; H04N 5/217; H04N 1/6033; H04N 1/6044; H04N 1/6052
See application file for complete search history.

(56) References Cited

U.S. PATENT DOCUMENTS

| | | | |
|---|---|---|---|
| 7,965,338 B2 * | 6/2011 | Chen | G11B 27/10 348/194 |
| 2003/0112249 A1 * | 6/2003 | Cheng | H04N 5/04 345/547 |
| 2013/0128115 A1 | 5/2013 | Oostveen et al. | |

FOREIGN PATENT DOCUMENTS

| | | |
|---|---|---|
| CN | 1436005 A | 8/2003 |
| CN | 1784024 A | 6/2006 |
| CN | 101170704 B | 6/2011 |
| CN | 103051921 A | 4/2013 |
| CN | 103313089 A | 9/2013 |
| TW | 200735012 A | 9/2007 |

* cited by examiner

*Primary Examiner* — Michael Teitelbaum
(74) *Attorney, Agent, or Firm* — Steven Reiss

(57) ABSTRACT

A terminal device and a method for a terminal device to synchronize audio and video for playback provides a video module in the terminal device. From first and second video segments, the video module generates a video segment including a plurality of cycles, each cycle of the video segment comprises a first video content and a second video content. Time lengths of the first and second video contents change according to a preset rule to take account of time differences.

16 Claims, 12 Drawing Sheets

$\Delta T1 = Video1 - Audio$ $\Delta T2 = Video2 - Audio$

AUDIO AND VIDEO SYNCHRONIZATION METHOD AND TERMINAL DEVICE USING THE SAME

FIELD

The subject matter herein generally relates to multimedia data synchronization.

BACKGROUND

Figure 1:
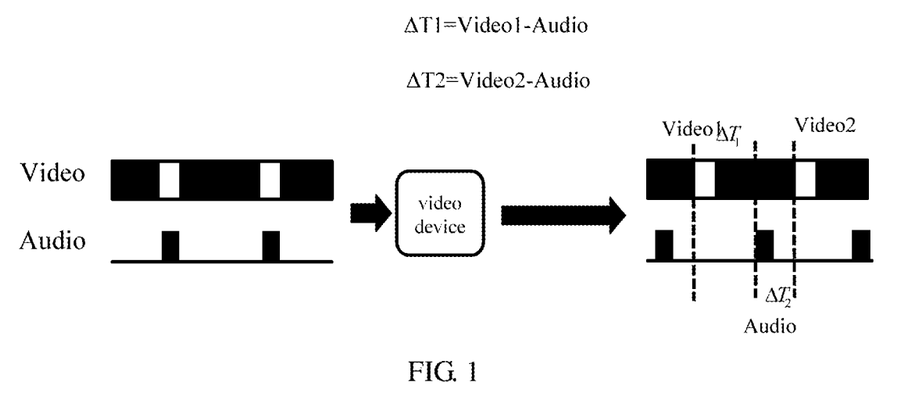
FIG. 1 illustrates, as a schematic diagram, a traditional error detection process between audio data and video data.

In existing audio and video synchronization detection methods, as black video is played and displayed on a playing device, audio signals with a specific frequency are played. A white video is suddenly played and displayed, and a testing device, for example, an oscilloscope, is used to measure a time difference between the white videos and the audio signals. When the white videos and the sound signals enter the testing device, two time differences are detected, for example, $\Delta T1$ and $\Delta T2$ shown in FIG. 1, where $\Delta T1$=Video1−Audio and $\Delta T2$=Video2−Audio. However, the two time differences need to be checked to determine which time difference is true.

BRIEF DESCRIPTION OF THE DRAWINGS

Implementations of the present technology will now be described, by way of example only, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

It should be noted that references to "an" or "one" embodiment in this disclosure are not necessarily to the same embodiment, and such references mean "at least one."

In general, the word "module" as used hereinafter, refers to logic embodied in computing or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or computing modules and may be stored in any type of non-transitory computer-readable medium or other storage device. Some non-limiting examples of non-transitory computer-readable media include CDs, DVDs, BLU-RAY, flash memory, and hard disk drives. The term "comprising", when utilized, means "including, but not necessarily limited to"; it specifically indicates open-ended inclusion or membership in a so-described combination, group, series, and the like.

Figure 2:
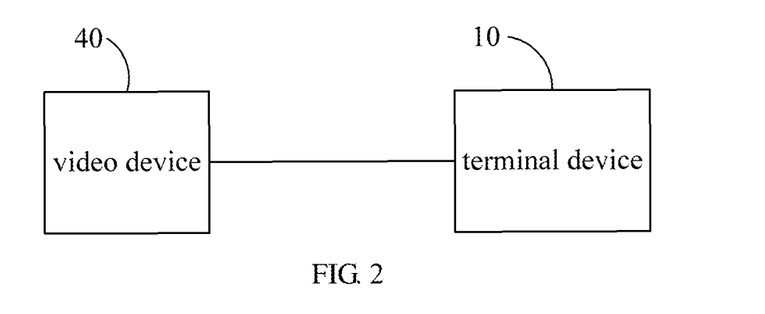
FIG. 2 illustrates a diagrammatic view of an application environment of a terminal device.

FIG. 2 illustrates an application environment of a terminal device (terminal device 10). In this embodiment, the terminal device 10 connects with a video device 40. The video device 40 may be a set top box or a smart TV.

Figure 3:
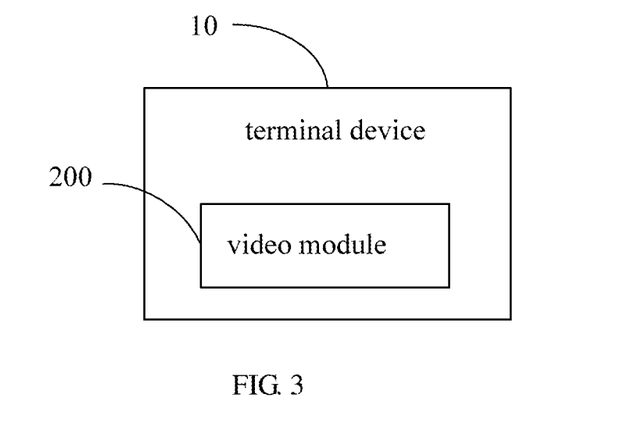
FIG. 3 illustrates a block diagram of one embodiment of functional modules of the terminal device of FIG. 2.

FIG. 3 illustrates one embodiment of functional modules of the terminal device 10. The terminal device 10 includes a video module 200 generating a video segment which includes a plurality of cycles. Each of the cycles comprises a first video content and a second video content. A first time length of the first video content and a second time length of the second video content are changed according to a preset rule. The first video content can comprise white video data and the second video content can comprise black video data, or the first video content and the second video content can both comprise a combination of other color video data.

Figure 4:
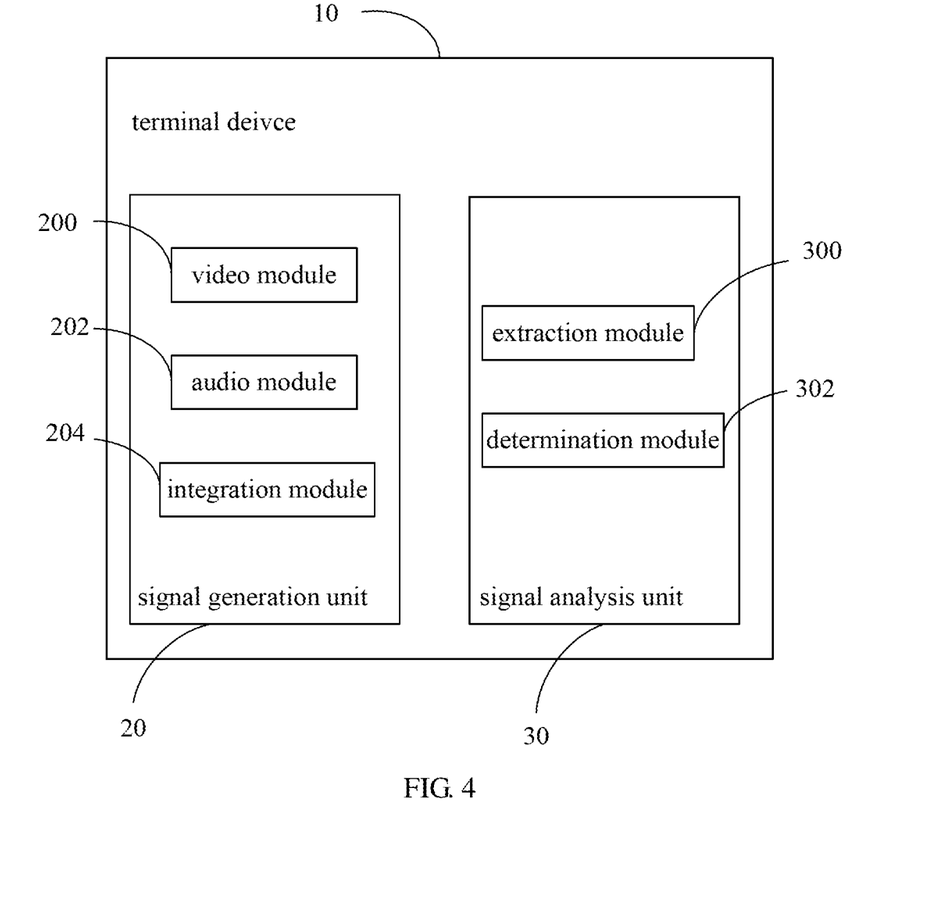
FIG. 4 illustrates a block diagram of another embodiment of functional modules of the terminal device of FIG. 2.

FIG. 4 illustrates another embodiment of functional modules of the terminal device 10. In this embodiment, the terminal device 10 includes a signal generation unit 20 and a signal analysis unit 30. The signal generation unit 20 includes a video module 200, an audio module 202, and an integration module 204. The signal analysis unit 30 includes an extraction module 300 and a determination module 302.

Figure 6:
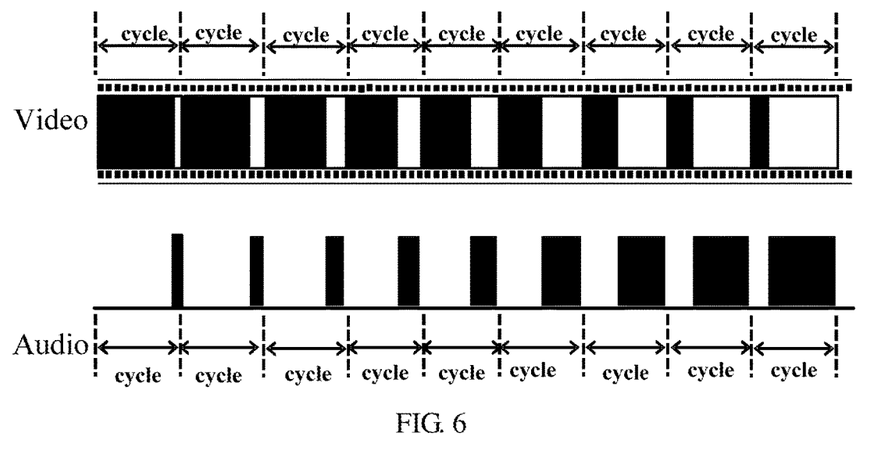
FIG. 6 illustrates a diagrammatic view of a first video fragment generated by the terminal device of FIG. 2.

The video module 200 generates a video segment which includes a plurality of cycles. FIG. 6 illustrates a structure of the video segment which includes 9 cycles. The quantity of data of the cycles may be the same or different. Each cycle of the video segment may include at least two distinguishable fragments, comprising, for example, black and white video fragments or combinations of other color video fragments. The black video fragment and the white video fragment serve as an example, the video contents transform along with a change of the number of cycles. For example, in FIG. 6, respective lengths of the white video fragments linearly increase with increases of the number of cycles within the continuous 9 cycles. Respective lengths of the black video fragments linearly decrease with increases of the number of cycles within the continuous 9 cycles. In one embodiment, within a cycle, a time length of the white video fragment (W) equals (the number of white video frames increment*n+initial value)/the number of frames per second. A time length of the black video fragment (B) equals time of a cycle (P)−(W).

The audio module 202 generates an audio segment which includes a plurality of cycles. FIG. 6 illustrates a structure of the audio segment which includes 9 cycles. Each cycle of the audio segment may include at least two distinguishable fragments. In one embodiment, a cycle of the audio segment includes a first audio content and a second audio content. The first audio content may comprise a sound fragment with a specific frequency and the second audio content may comprise a silent fragment. The first audio content also may comprise a first audio fragment with a first specific frequency and the second audio content may comprise a second audio fragment with a second specific frequency. The time length of the sound fragment in a first cycle is equal to the time length of the white video fragment in a first cycle. The time length of the sound fragment in a second cycle is equal to the time length of the white video fragment in a second cycle. The time length of the sound fragment in a ninth cycle is equal to the time length of the white video fragment in a ninth cycle. Correspondingly, the time lengths of the silent fragments are linearly decreased within the continuous 9 cycles. The time length of the sound fragment equals the time length of the white video fragment (Wn) and the time length of the silent video fragment equals the time length of the black video fragment (Bn).

The making of a test film which is 9 seconds long is described. The test film includes 9 cycles, each cycle of the test film is 1 second long. The test film is preset to play 30 frames per second. A rule is preset that the white video fragment increases 3 frames for each additional cycle, correspondingly, the number of the black video fragment decreases 3 frames for each additional cycle. For example, a first cycle of the test film includes a white video fragment including 3 frames, and a black video fragment including 27 frames, and the time lengths of the white video fragments within 9 cycles comprise 0.1 s, 0.2 s, 0.3 s, 0.4 s, 0.5 s, 0.6 s, 0.7 s, 0.8 s, and 0.9 s. The time lengths of the black video fragments within 9 cycles comprise 0.9 s, 0.8 s, 0.7 s, 0.6 s, 0.5 s, 0.4 s, 0.3 s, 0.2 s, and 0.1 s. Correspondingly, the time lengths of the sound fragments within 9 cycles comprise 0.1 s, 0.2 s, 0.3 s, 0.4 s, 0.5 s, 0.6 s, 0.7 s, 0.8 s, and 0.9 s. The time lengths of the silent fragments within 9 cycles comprise 0.9 s, 0.8 s, 0.7 s, 0.6 s, 0.5 s, 0.4 s, 0.3 s, 0.2 s, and 0.1 s.

After the video module 200 and the audio module 202 generate the video segments and audio segments, the integration module 204 integrates and encodes the video segments and audio segments into a complete first video section (hereinafter the test section).

After receiving the test section, the video device decodes the test section to generate a second video section, and transmits the second video section to the signal analysis unit 30. The difference between start time of extracting the video fragment (Tv) and start time of extracting the audio fragment (Ta) represents an audio and video synchronization error. After receiving the second video section, the signal analysis unit 30 performs an audio and video synchronization detection operation.

Figure 7:
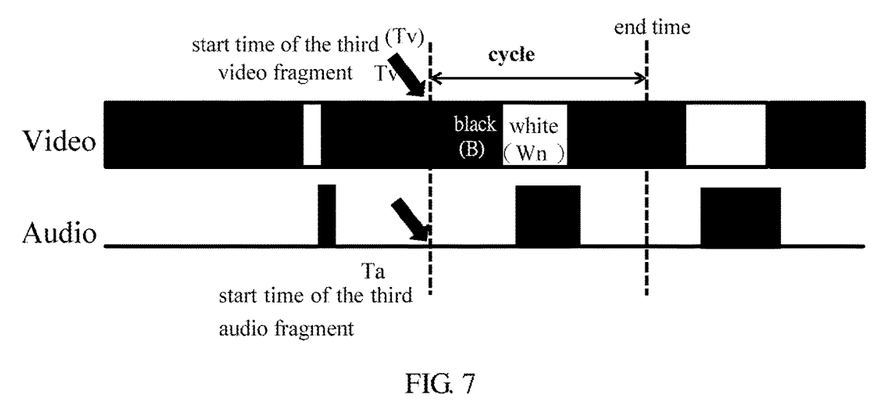
FIG. 7 illustrates a diagrammatic view of a first cycle detection signal extracted by the terminal device of FIG. 2.
Figure 8:
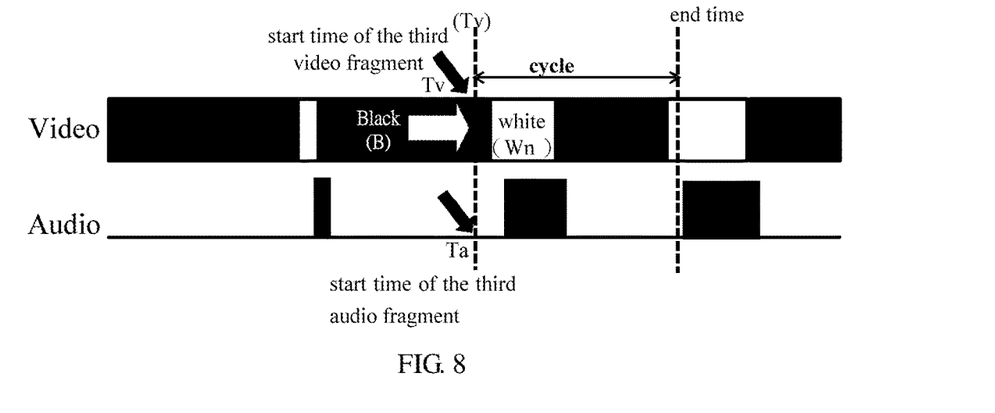
FIG. 8 illustrates a diagrammatic view of a second cycle detection signal extracted by the terminal device of FIG. 2.
Figure 9:
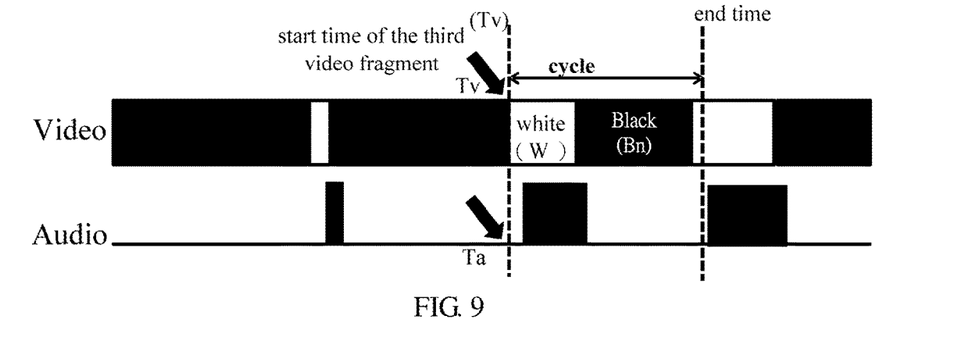
FIG. 9 illustrates a diagrammatic view of a third cycle detection signal extracted by the terminal device of FIG. 2.
Figure 10:
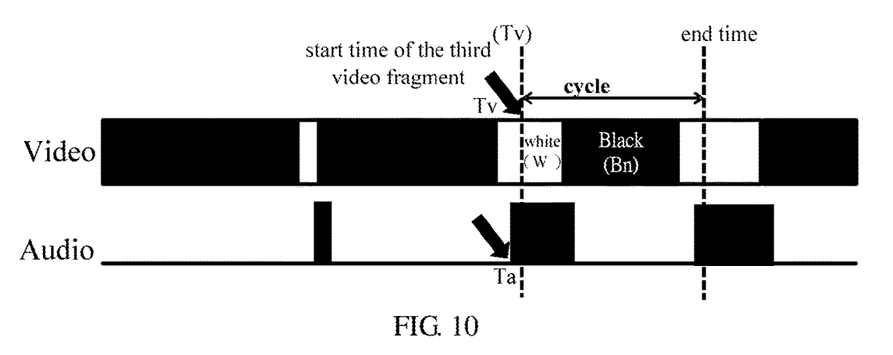
FIG. 10 illustrates a diagrammatic view of a fourth cycle detection signal extracted by the terminal device of FIG. 2.
Figure 11:
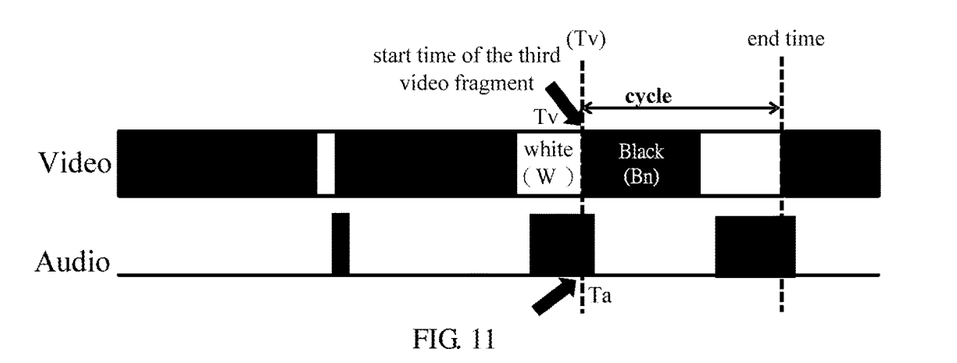
FIG. 11 illustrates a diagrammatic view of a fifth cycle detection signal extracted by the terminal device of FIG. 2.

The extraction module 300 of the signal analysis unit 30 extracts a third video section having a predetermined time length from the second video section. The third video section is a cycle of the second video section, and the time length of the cycle of the second video section is equal to the time length of the cycle which is preset in the test section. For example, when the time length of the cycle of the test section is 1 second long, the extraction module 300 extracts a third video section which is 1 second long from the second video section. The determination module 302 determines a distribution of the black video fragment and of the white video fragment in the third video section. According to the structure of the test section, the third video section, which includes a third video segment and a third audio segment, may be one of the following five cases. In the first case, as FIG. 7 illustrates, the third video segment includes a black video fragment+a white video fragment+a black video fragment, and the corresponding third audio segment includes a silent fragment+a sound fragment+a silent fragment. In the second case, as FIG. 8 illustrates, the third video segment includes a black video fragment+a white video fragment+a black video fragment+a white video fragment, and the corresponding third audio segment includes a silent fragment+a sound fragment+a silent fragment. In the third case, as FIG. 9 illustrates, the third video segment includes a white video fragment+a black video fragment+a white video fragment, and the corresponding third audio segment includes a silent fragment+a sound fragment+a silent fragment. In the fourth case, as FIG. 10 illustrates, the third video segment includes a white video fragment+a black video fragment+a white video fragment, and the corresponding third audio segment includes a sound fragment+a silent fragment+a sound fragment. In the fifth and final case, as FIG. 11 illustrates, the third video segment includes a black video fragment+a white video fragment, and the corresponding third audio segment includes a sound fragment+a silent fragment+a sound fragment.

The terminal device has information about the structure of the test section, so it can calculate the start time of extracting the third video section according to the five different cases. As an audio fragment corresponds to a video fragment, the third audio segment also may be derived from the five cases. Although not all of the five cases are shown due to the arbitrariness of extracting, there may be one of five cases as the third video segment. Similarly, the terminal device has information about the structure of test section, so it can calculate the start time of extracting the audio fragment according to the five different cases. The manner of calculating the start time of extracting the audio fragment is identical to the manner of calculating the start time of extracting the video fragment. The following illustrates the manner of calculating the start time of extracting the video fragment.

It may be determined that the structure of the third video segment belongs to the first case, as shown in FIG. 7. In the first case, the starting point extracted is in the black video fragment, and the third video segment is configured with the black video fragment+the white video fragment+the black video fragment. The determination module 302 calculates time length B of the left black video fragment according to the number of frames of the left black video fragment. The determination module 302 also determines that the white video fragment is located in an n-th cycle of the second video section according to the number of frames of the white video fragment and the preset rule that the number of frames of the white video fragment is increased with addition of cycles. This determines the time length Wn of the white video fragment. The terminal device calculates the third video segment start time according to formula Tv=P*n−Wn−B. In the formula, Tv stands for the start time of extracting the third video segment, P stands for a cycle of the first video section, and the start time Tv for extracting the corresponding third video segment is calculated.

It may be determined that the structure of the third video segment belongs to the second case, as shown in FIG. 8. In the second case, the starting point is in the black video fragment, and the third video segment is configured with the black video fragment+the white video fragment+the black video fragment+the white video fragment. The determination module 302 calculates time length B of the left black video fragment according to the number of frames of the left black video fragment. The determination module 302 also determines that the white video fragment is located in an n-th cycle of the second video section according to the number of frames of the white video fragment and the preset rule that the number of frames of the white video fragment is increased with addition of cycles. This determines the time length of the white video fragment Wn. The terminal device calculates the start time of the third video segment according to a formula $Tv=P*n-Wn-B$, and can thus calculate the start time Tv for extracting the corresponding third video segment.

It may be determined that the structure of the third video segment belongs to the third case, as shown in FIG. 9. In the third case, the starting point is in the boundary between the black video fragment and the white video fragment, and the third video segment is configured with the white video fragment+the black video fragment+the white video fragment. The determination module 302 determines that the black video fragment is located in an n-th cycle of the second video section according to the number of frames of the black video fragment and the preset rule that the number of frames of the black video fragment is decreased with addition of cycles. The white video fragment time length Wn is thus determined. The terminal device calculates the start time of extracting the third video segment according to formula $Tv=P*(n-1)-W$. In addition, the determination module 302 determines the start time Ta of the third audio segment in a cycle, and a time difference is calculated according to formula $\Delta T=Tv-Ta$.

It may be determined that the structure of the third video segment belongs to the fourth case, as shown in FIG. 10. In the fourth case, the starting point is in the white video fragment, and the third video segment is configured with the white video fragment+the black video fragment+the white video fragment. The determination module 302 determines that the black video fragment is located in an n-th cycle of the second video section according to the number of frames of the black video fragment and the preset rule that the number of frames of the black video fragment is decreased with addition of cycles. The determination module 302 also determines a time length W of a first-time-displayed white video fragment according to the number of frames of the first-time-displayed white video fragment. The terminal device calculates the start time of the third video segment according to formula $Tv=P*(n-1)-W$, and calculates the extraction start time Tv of the corresponding third video segment.

It may be determined that the structure of the third video segment belongs to the fifth case, as shown in FIG. 11. In the fifth case, the starting point is in the boundary between the black video fragment and the white video fragment, and the third video segment is configured with the black video fragment+the white video fragment. The determination module 302 determines that the white video fragment is located in an n-th cycle of the second video section according to the number of frames of the white video fragment and the preset rule that the number of frames of the white video fragment is increased with addition of cycles. The terminal device calculates the start time of the third video segment according to formula $Tv=P*(n-1)$, and calculates the extraction start time Tv of the corresponding third video segment.

Similarly, the determination module 302 can determine the structure of the third audio segment, and calculate the start time Ta of the third audio segment according to the formula corresponding to the structure. The time difference according to formula $\Delta T=Tv-Ta$ can also be calculated.

When the extraction start time of the third audio segment is calculated, and the first audio content comprises the sound fragment with the specific frequency and the second audio content comprises the silent fragment, the cycle in which the sound fragment is found can be determined by the sound fragment. The silent fragment time length can be determined by an existing device. Similarly, the start time Ta of the third audio segment can also be calculated. When the first audio content is the sound fragment with the first specific frequency and the second audio content is the sound fragment with the second specific frequency, the time lengths of different audio contents can be calculated according to the sound frequency and the corresponding frequency of each audio content. The cycle in which the third audio segment may be found can be determined by the audio content time length and the preset rule, so that the start time Ta of the third audio segment can be calculated.

The example of the test film which is 9 seconds long illustrates how the signal analysis unit 30 calculates the time difference.

It may be determined that the structure of the third video segment belongs to the first case, as shown in FIG. 7. If determined as belonging to the first case, the left black video fragment time length B is 0.2 seconds according to the number of frames of the left black video fragment, the time length of the white video fragment B is 0.3 seconds according to the number of frames of the white video fragment, and the white video is located in the 3rd cycle. The determination module 302 can calculate the extraction start time of the third video segment as $Tv=1*3-0.3-0.2=2.5$ s according to the formula $Tv=P*n-Wn-B$. Similarly, if the determination module 302 determines that the start time Ta of the third audio segment in one cycle is 2.4 s, the time difference is 0.1 s which is calculated according to formula $\Delta T=Tv-Ta=2.5-2.4$, thus equaling 0.1 s.

It may be determined that the structure of the third video segment belongs to the second case, as shown in FIG. 8. If determined as belonging to the second case, the left part of the time length of the black video fragment is 0.03 s according to the frames of the left black video fragment, and the left part of the time length of the white video fragment is 0.3 s according to the number of frames of the left white video fragment, so that the white video fragment is determined as in the 3rd cycle. The terminal device can calculate the extraction start time of the third video segment as $Tv=1*3-0.3-0.03=2.67$ s according to the formula $Tv=P*n-Wn-B$. Similarly, if the determination module 302 determines that the start time Ta of the third audio segment in one cycle is 2.57 s, the time difference is 0.1 s which is calculated according to formula $\Delta T=Tv-Ta=2.67-2.57$, thus equaling 0.1 s.

It may be determined that the structure of the third video segment belongs to the third case, as shown in FIG. 9. If determined as belonging to the third case, the left part of the time length of the white video fragment is 0.3 s according to the number of frames of the left white video fragment, the left part of the time length of the black video fragment is 0.6 s, and the black video fragment is located in the 4th cycle. The terminal device can calculate the extraction start time of the third video segment as $Tv=P*(n-1)-W=1*3-0.3=2.7$ s. Similarly, if the determination module 302 determines that the start time Ta of the third audio segment in one cycle is 2.6 s, the time difference is 0.1 s, calculated according to formula $\Delta T=Tv-Ta=2.7-2.6$, thus equaling 0.1 s.

It may be determined that the structure of the third video segment belongs to the fourth case, as shown in FIG. 10. If so determined, the left part of the time length of the white video fragment is 0.2 s according to the number of frames of the left white video fragment, and the left part of the time length of the black video fragment is 0.6 s, so that the black video fragment is located in the 4th cycle. The terminal device can calculate the extraction start time of the third video segment as Tv=P*(n−1)−W=1*(4−1)−0.2=2.8 s. Similarly, if the determination module 302 determines that the start time Ta of the third audio segment in one cycle is 2.7 s, the time difference is 0.1 s, calculated according to formula ΔT=Tv−Ta=2.8−2.7, thus equaling 0.1 s.

It may be determined that the structure of the third video segment belongs to the fifth case, as shown in FIG. 11. If so determined, (the black part time length is 0.6 s according to the number of frames of the black video fragment, and the time length of the white video fragment is 0.4 s, so that the white video fragment is located in the 5th cycle. The terminal device can calculate the extraction start time of the third video segment as Tv=P*(n−1)=1*(4−1)=3 s. Similarly, if the determination module 302 determines that the start time Ta of the third audio segment in one cycle is 2.9 s, the time difference is 0.1 s, calculated according to formula ΔT=Tv−Ta=3−2.9, thus equaling 0.1 s.

Figure 5:
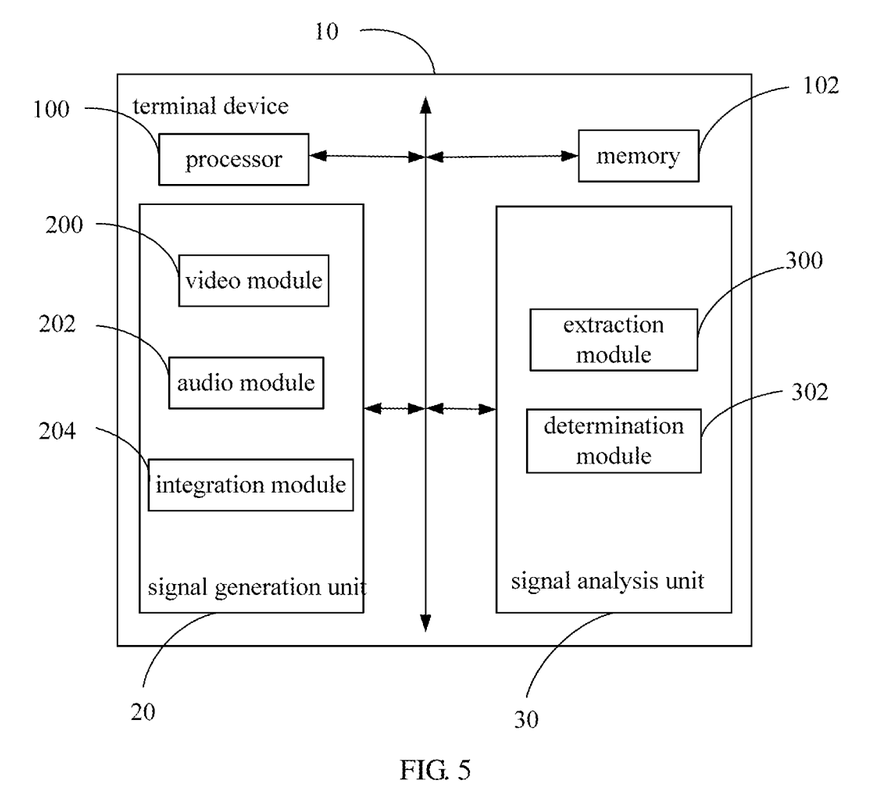
FIG. 5 illustrates a block diagram of another embodiment of functional modules of the terminal device of FIG. 2.

FIG. 5 illustrates another embodiment of functional modules of the terminal device 10. In this embodiment, the terminal device 10 includes a signal generation unit 20 and a signal analysis unit 30. The signal generation unit 20 includes a video module 200, an audio module 202, and an integration module 204. The signal analysis unit 30 includes an extraction module 300, a determination module 302, a processor 100, and a memory 102. In this embodiment, the memory 102 stores the code of programs 20 and 30 and other information of the terminal device 10. The modules are executed by one or more processors to perform their respective functions. Each module is a computer program for a specific function. These functional modules are identical to those in FIG. 4.

Figure 12:
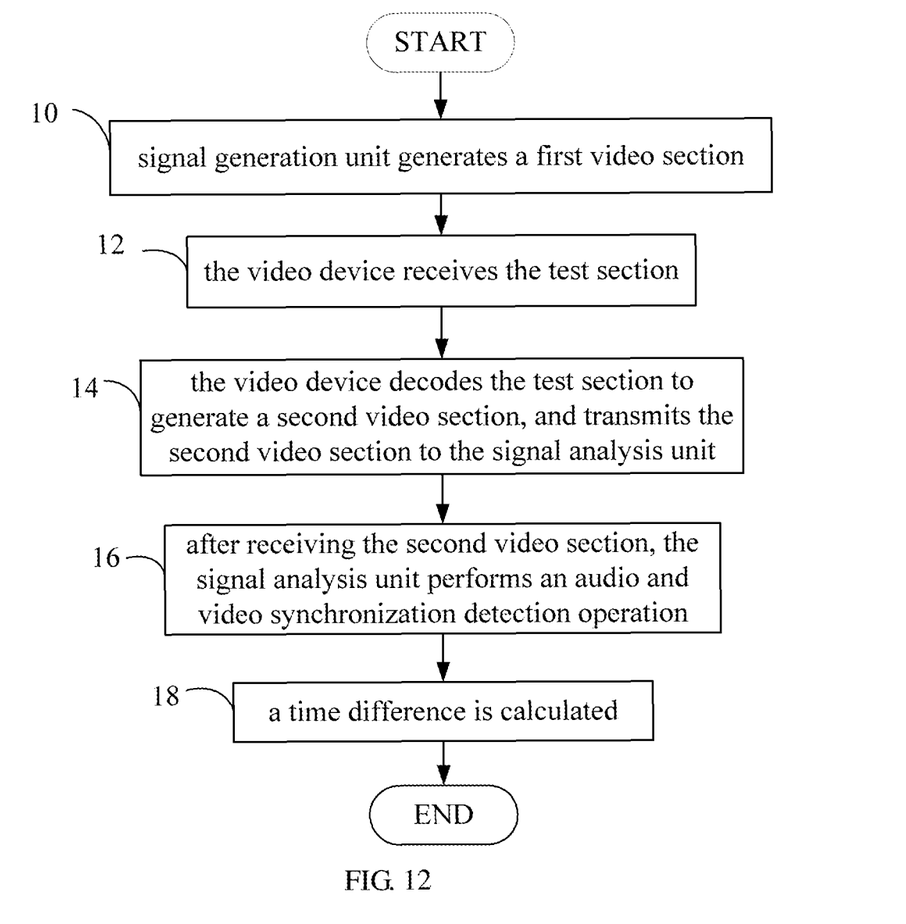
FIG. 12 illustrates a flowchart of an audio and video synchronization method applied to the terminal device of FIG. 2.

FIG. 12 illustrates a flowchart of an audio and video synchronization method applied to the terminal device 10. The audio and video synchronization method can be executed by the terminal device 10.

At block 10, the signal generation unit 20 generates a first video section, the steps of generating the first video section comprises the following steps. The video module 200 generates a video segment which includes a plurality of cycles, the structure of the video segment is shown in FIG. 6. FIG. 6 illustrates a structure of a video segment which includes 9 cycles. Each cycle of the video segment may include at least two distinguishable fragments. For example, black and white video fragments or combinations of other color video fragment. The black video fragment and the white video fragment serve as an example, the respective lengths of the white video fragments linearly increase with increases of the number of cycles within the continuous 9 cycles. The respective lengths of the black video fragments linearly decrease with increases of the number of cycles within the continuous 9 cycles. The audio module 202 generates an audio segment which includes a plurality of cycles, the structure of the audio segment is shown in FIG. 6. FIG. 6 illustrates a structure of an audio segment which includes 9 cycles. Each cycle of the audio segment may include at least two distinguishable fragments. They may be a sound fragment with a specific frequency and a silent fragment. The time length of the sound fragment in a first cycle is equal to the time length of the white video fragment in a first cycle. The time length of the sound fragment in a second cycle is equal to the time length of the white video fragment in a second cycle. The time length of the sound fragment in a ninth cycle is equal to the time length of the white video fragment in a ninth cycle. Correspondingly, the time lengths of the silent fragments are linearly decreased within the continuous 9 cycles. After the video module 200 and the audio module 202 generates the video fragments and audio fragments, the integration module 204 integrates and encodes the video fragments and audio fragments into a complete first video section (hereinafter the test section).

At block 12, the video device receives the test section.

At block 14, the video device decodes the test section to generate a second video section, and transmits the second video section to the signal analysis unit 30.

At block 16, after receiving the second video section, the signal analysis unit 30 performs an audio and video synchronization detection operation. The extraction module 300 extracts a third video section according to a preset time length from the second video section. The third video section is a cycle of the second video section, and the time length of the cycle of the second video section is equal to the time length of the cycle which is preset in the test section. For example, when the time length of the cycle of the test section is 1 second long, the extraction module 300 extracts a third video section which is 1 second long from the second video section. The 1 second video section includes a third video fragment and a third audio fragment. The determination module 302 determines a distribution of the black video fragment and of the white video fragment in the third video fragment. According to the structure of the test section, the third video segment may be one of the following five cases. In the first case, as FIG. 7 illustrates, the third video segment includes a black video fragment+a white video fragment+a black video fragment, and the corresponding third audio segment includes a silent fragment+a sound fragment+a silent fragment. In the second case, as FIG. 8 illustrates, the third video segment includes a black video fragment+a white video fragment+a black video fragment+a white video fragment, and the corresponding third audio segment includes a silent fragment+a sound fragment+a silent fragment. In the third case, as FIG. 9 illustrates, the third video segment includes a white video fragment+a black video fragment+a white video fragment, and the corresponding third audio segment includes a silent fragment+a sound fragment+a silent fragment. In the fourth case, as FIG. 10 illustrates, the third video segment includes a white video fragment+a black video fragment+a white video fragment, and the corresponding third audio segment includes a sound fragment+a silent fragment+a sound fragment. In the fifth case, as FIG. 11 illustrates, the third video segment includes a black video fragment+a white video fragment, and the corresponding third audio segment includes a sound fragment+a silent fragment+a sound fragment.

At block 18, The determination module 302 determines a distribution of the black video fragment and of the white video fragment which are extracted in a cycle length. It may be determined that the structure of the third video segment belongs to the first case, as shown in FIG. 7. In the first case, the starting point extracted is in the black video fragment, and the third video segment is configured with the black video fragment+the white video fragment+the black video fragment. The determination module 302 calculates the left black video fragment time length B according to the number of frames of the left black video fragment. The determination module 302 also determines that the white video fragment is located in an n-th cycle of the second video section according to the number of frames of the white video fragment and the preset rule that the number of frames of the white video fragment is increased with addition of cycles. This determines the time length Wn of the white video fragment. The terminal device calculates the start time of the third video segment according to formula Tv=P*n−Wn−B. In addition, the determination module 302 determines the start time Ta of the third audio segment in a cycle, and a time difference is calculated according to formula ΔT=Tv−Ta.

It may be determined that the structure of the third video segment belongs to the second case, as shown in FIG. 8. In the second case, the starting point is in the black video fragment, and the third video segment is configured with the black video fragment+the white video fragment+the black video fragment+the white video fragment. The determination module 302 calculates time length B of the left black video fragment according to the number of frames of the left black video fragment. The determination module 302 also determines that the white video fragment is located in an n-th cycle of the second video section according to the number of frames of the white video fragment and the preset rule that the number of frames of the white video fragment is increased with addition of cycles. This determines the time length Wn of the white video fragment. The terminal device calculates the start time Tv of the third video segment according to formula Tv=P*n−Wn−B. In addition, the determination module 302 determines the start time Ta of the third audio segment in a cycle, and a time difference is calculated according to ΔT=Tv−Ta.

It may be determined that the structure of the third video segment belongs to the third case, as shown in FIG. 9. In the third case, the starting point is in the boundary between the black video fragment and the white video fragment, and the video fragment is configured with the white video fragment+the black video fragment+the white video fragment. The determination module 302 determines that the black video is located in an n-th cycle of the second video section according to the number of frames of the black video fragment and the preset rule that the number of frames of the black video fragment is decreased with addition of cycles. The white video time length Wn is thus determined. The terminal device calculates the start time Tv of extracting the third video segment according to formula Tv=P*(n−1)−W. In addition, the determination module 302 determines the start time Ta of the third audio segment in a cycle, and a time difference is calculated according to ΔT=Tv−Ta.

It may be determined that the structure of the third video segment belongs to the fourth case as shown in FIG. 10. In the fourth case, the starting point is in the white video fragment, and the third video segment is configured with the white video fragment+the black video fragment+the white video fragment. The determination module 302 determines that the white black fragment is located in an n-th cycle in the second video fragment according to the number of frames of the black video fragment and the preset rule that the number of frames of the black video fragment is decreased with addition of cycles. The determination module 302 also determines the first-time-displayed white video fragment time length W according to the first-time-displayed number of frames of the white video fragment. The terminal device calculates the start time Tv of the third video segment according to formula Tv=P*(n−1)−W. In addition, the determination module 302 determines the start time Ta of the third audio segment in a cycle, and a time difference is calculated according to ΔT=Tv−Ta.

It may be determined that the structure of the third video segment belongs to the fifth case as shown in FIG. 11. In the fifth case, the starting point is in the boundary between the black video fragment and the white video fragment, and the third video segment is configured with the black video fragment+the white video fragment. The determination module 302 determines that the white video fragment is located in an n-th cycle of the second video section according to the number of frames of the white video fragment and the preset rule that the number of frames of the white video fragment is increased with addition of cycles. The terminal device calculates the start time Tv of the third video segment according to formula Tv=P*(n−1). In addition, the determination module 302 determines the start time Ta of the third audio segment in a cycle, and a time difference is calculated according to ΔT=Tv−Ta.

The terminal device 10 and the audio and video synchronization method in this disclosure implementation set a predetermined rule that the contents of the test section specific changes. After the test section being played, the terminal device 10 receives the test section, at the same time, the terminal device 10 can accurately calculate the time difference between the audio and the video according to the structure of the test section without manual intervention. The terminal device 10 can automatically determine the difference, which improves the degree of automation in the computational time difference between audio and video.

It should be emphasized that the above-described embodiments of the present disclosure, including any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:

1. A terminal device, for being connected with a video device, the terminal device comprising:
at least one processor;
a non-transitory storage system coupled to the at least one processor and configured to store one or more programs configured to be executed by the at least one processor, the one or more programs comprising instructions for:
generating a video segment which includes a plurality of cycles, wherein each of the cycles comprises a first video content and a second video content, wherein a first time length of the first video content and a second time length of the second video content are changed according to a preset rule;
generating an audio segment which includes a plurality of cycles, wherein each of the cycles comprises a first audio content and a second audio content, and a time length of the first audio content and a time length of the second audio content are changed according to the preset rule;
integrating the video segment and the audio segment into a first video section; and
transmitting the first video section to the video device to be decoded as a second video section;
receiving the second video section from the video device;
extracting a third video section having a predetermined time length from the second video section, wherein the third video section comprises a third video segment and a third audio segment.

2. The terminal device as claimed in claim 1, wherein the one or more programs further comprise instructions for:

determining start time of the third video segment and start time of the third audio segment; and calculating a time difference according to the start time of the third video segment and the start time of the third audio segment.

3. The terminal device as claimed in claim 1, wherein the third video segment is composed of one or more fragments of the first video content and one or more fragments of the second video content.

4. The terminal device as claimed in claim 3, wherein when the start time of the third video segment is located in a boundary between the first video content and the second video content, and the third video segment begins with the second video content, the one or more programs further comprise instructions for:

calculating the start time of the third video segment according to a formula Tv=P*(n−1)−T1, wherein Tv stands for the start time of the third video segment, P stands for a cycle of the first video section, n is the number of the cycles according to the time length of the first-time-displayed fragment of the first video content and the preset rule, and T1 is the time length of the first-time-displayed fragment of the second video content.

5. The terminal device as claimed in claim 3, wherein when the start time of the third video segment is located in a boundary between the first video content and the second video content, and the third video segment begins with the first video content, the one or more programs further comprise instructions for:

calculating the start time of the third video segment according to a formula Tv=P*(n−1), wherein Tv stands for the start time of the third video segment, P stands for a cycle of the first video section, and n is the number of the cycles according to the time length of the first-time-displayed fragment of the first video content and the preset rule.

6. The terminal device as claimed in claim 3, wherein when the start time of the third video segment is located in a fragment of the first video content, the one or more programs further comprise instructions for:

calculating the start time of the third video segment according to a formula Tv=P*n−T2−T3, wherein Tv stands for the start time of the third video segment, P stands for a cycle of the first video section, n is the number of the cycles according to the time length of the first-time-displayed fragment of the first video content and the preset rule, T2 is the time length of the first-time-displayed fragment of the first video content, and T3 is the time length of the first-time-displayed fragment of the second video content.

7. The terminal device as claimed in claim 3, wherein when the start time of the third video segment is located in a fragment of the second video content, the one or more programs further comprise instructions for:

calculating the start time of the third video segment according to a formula Tv=P*(n−1)−T4, wherein Tv stands for the start time of the third video segment, P stands for a cycle of the first video section, n is the number of the cycles according to the time length of the first-time-displayed fragment of the first video content and the preset rule, and T4 is the time length of the first-time-displayed fragment of the second video content.

8. The terminal device as claimed in claim 1, wherein the preset rule is that the time lengths of the first video contents are linearly decreased by the increases of the number of cycles, and the time lengths of the second video contents are linearly increased by the increases of the number of cycles.

9. An audio video synchronous detection method operable to be executed in a terminal device, the method comprising:

generating a video segment which includes a plurality of cycles, wherein each of the cycles comprises a first video content and a second video content, wherein a first time length of the first video content and a second time length of the second video content are changed according to a preset rule;

generating an audio segment which includes a plurality of cycles, wherein each of the cycles comprises a first audio content and a second audio content, wherein a time length of the first audio content and a time length of the second audio content are changed according to the preset rule; and integrating the video segment and the audio segment into a first video section, and transmitting the first video section to the video device to be decoded as a second video section;

receiving the second video fragment from the video device;

extracting a third video section having a predetermined time length from the second video section, wherein the third video section includes a third video segment and a third audio segment.

10. The audio video synchronous detection method as claimed in claim 9, further comprising:

determining start time of the third video segment and start time of the third audio segment; and calculating a time difference according to the start time of the third video segment and the start time of the third audio segment.

11. The audio video synchronous detection method as claimed in claim 9, wherein the third video segment is composed of one or more fragments of the first video content and one or more fragments of the second video content.

12. The audio video synchronous detection method as claimed in claim 11, wherein the method further comprises:

when the start time of the third video segment is located in a boundary of the first video content and the second video content, and the third video segment begins with the second video content, calculating the start time of the third video segment according to a formula Tv=P*(n−1)−T1, wherein Tv stands for the start time of the third video segment, P stands for a cycle of the first video section, n is the number of the cycles according to the time length of the first-time-displayed fragment of the first video content and the preset rule, and T1 is the time length of the first-time-displayed fragment of the second video content.

13. The audio video synchronous detection method as claimed in claim 11, wherein the method further comprises:

when the start time of the third video segment is located in a boundary of the first video content and the second video content, and the third video segment begins with the first video content, calculating the start time of the third video segment according to a formula Tv=P*(n−1), wherein Tv stands for the start time of the third video segment, P stands for a cycle of the first video section, and n is the number of the cycles according to the time length of the first-time-displayed fragment of the first video content and the preset rule.

14. The audio video synchronous detection method as claimed in claim 11, wherein the method further comprises:

when the start time of the third video segment is located in a fragment of the first video content, calculating the start time of the third video segment according to a formula $Tv=P*n-T2-T3$, wherein Tv stands for the start time of the third video segment, P stands for a cycle of the first video section, n is the number of the cycles according to the time length of the first-time-displayed fragment of the first video content and the preset rule, T2 is the time length of the first-time-displayed fragment of the first video content, and T3 is the time length of the first-time-displayed fragment of the second video content.

15. The audio video synchronous detection method as claimed in claim 11, wherein the method further comprises:
when the start time of the third video segment is located in a fragment of the second video content, calculating the start time of the third video segment according to a formula $Tv=P*(n-1)-T4$, wherein Tv stands for the start time of the third video segment, P stands for a cycle of the first video section, n is the number of the cycles according to the time length of the first-time-displayed fragment of the first video content and the preset rule, and T4 is the time length of the first-time-displayed fragment of the second video content.

16. The audio video synchronous detection method as claimed in claim 9, wherein the predetermined rule is that the time lengths of the first video contents are linearly decreased by the increases of the number of cycles, and the time lengths of the second video contents are linearly increased by the increases of the number of cycles.

* * * * *